United States Patent
Wu et al.

(10) Patent No.: US 6,503,586 B1
(45) Date of Patent: Jan. 7, 2003

(54) TITLE IMPROVED INFRARED ABSORBING POLYESTER PACKAGING POLYMER

(75) Inventors: Audrey Chung Wu, Greenville, SC (US); Gerald Willard McNeely, Spartanburg, SC (US)

(73) Assignee: Arteva North America S.A.R.L., Zurich (CH)

( * ) Notice: Subject to any disclaimer, the term of this patent is extended or adjusted under 35 U.S.C. 154(b) by 0 days.

(21) Appl. No.: 09/030,178

(22) Filed: Feb. 25, 1998

(51) Int. Cl.⁷ .............................. C08J 3/28; C08K 3/10; C08L 67/03
(52) U.S. Cl. ................... 428/35.7; 264/500; 428/36.92; 524/495
(58) Field of Search ...................... 428/36.92; 524/495; 264/500

(56) References Cited

U.S. PATENT DOCUMENTS

| | | | | |
|---|---|---|---|---|
| 4,250,078 A | * | 2/1981 | McFarlane et al. | 260/40 R |
| 4,408,004 A | | 10/1983 | Pengilly | 524/398 |
| 4,535,118 A | | 8/1985 | Pengilly | 524/398 |
| 4,895,904 A | * | 1/1990 | Allingham | 523/135 |
| 5,229,460 A | * | 7/1993 | Yousuf et al. | 525/198 |
| 5,409,983 A | | 4/1995 | Jones et al. | 524/439 |
| 5,419,936 A | | 5/1995 | Tindale | 428/35.8 |
| 5,529,744 A | | 6/1996 | Tindale | 264/532 |
| 5,922,473 A | * | 7/1999 | Muthiah et al. | 428/481 |
| 5,925,710 A | * | 7/1999 | Wu et al. | 524/495 |
| 6,022,920 A | | 2/2000 | Maxwell et al. | 524/431 |
| 6,117,222 A | * | 9/2000 | Nigam et al. | 106/31.27 |

OTHER PUBLICATIONS

United States Patent Application Publication No. US 2002/0027314, published Mar. 7,2002, for U.S. Patent Application No. 09/973,520, filed Oct. 9, 2001.

* cited by examiner

Primary Examiner—Sandra M. Nolan
(74) Attorney, Agent, or Firm—Gregory N. Clements

(57) ABSTRACT

The present invention relates to a polyester polymer composition containing inorganic black particles in the range of about 5 to about 150 parts per million based on the polymer. The size of the inorganic black particles is greater than about 0.5 microns. Such polyester polymers having inorganic black particles incorporated therein absorb infrared radiation better than polymers containing no inorganic black particles and thus in the production of plastic bottles less energy is required to blow-mold the bottles.

48 Claims, 3 Drawing Sheets

PET Absorption Spectrum

TITLE IMPROVED INFRARED ABSORBING POLYESTER PACKAGING POLYMER

FIELD OF THE INVENTION

The present invention relates to packaging polymers, particularly bottles made from packaging polymer compositions, and particularly polyester polymer compositions which have an improved infrared (IR) absorption characteristic. More specifically, the present invention relates to a polyester polymer composition that includes inorganic black pigments or particles as an infrared absorbing material. The present invention envisions the use of the polyester polymer compositions to make plastic bottles with acceptable color and clarity, and with good physical properties, and with improved infrared absorbing properties.

BACKGROUND OF THE INVENTION

The use of polyester compositions as a packaging material, particularly, compositions comprising polyethylene terephthalate, generally referred to as "PET," in the form of films, plastic bottles and other containers is well known. Plastic bottles are used for containing pressurized fluids such as carbonated drinks, e.g., soft drinks or mineral waters, as well as for non-carbonated, non-pressurized drinks. To form plastic bottles, the polymer is extruded and then formed into chips. The chips are employed to make a bottle preform by injection molding as is well known in the industry. The preform is then reheated and blown into a mold which provides the final shape of the bottle. The blow-molding step causes biaxial orientation of the polyester composition to occur at least in the side walls and the bottom of the bottles, and to a lesser degree in the neck. The biaxial orientation provides strength to the bottle so that it can resist deformation from internal pressure during use and adequately contain the fluid over an industry standardized shelf-life.

To summarize, a conventional polyester chip based on a modified PET resin is generally shipped to plastic bottle manufacturers who injection mold the polymer to make a bottle preform. The preform must then be heated to about 105° C. and blow-molded into a bottle shape. The rate of production of plastic bottles is usually limited by the time required to heat the preform. To reduce the energy required to heat the preform and to cause the preform to quickly achieve the desired blow-molding temperature of about 105° C. would be particularly useful in the industry. Of course, the blow-molding temperature varies for different polyester compositions; for example, polyethylene naphthalate would require a different blow-molding temperature.

Heating a conventional polyester preform to about 105° C. is typically achieved with commercially available quartz infrared lamps which emit in the near infrared region (NIR) as well as in the infrared region (IR) as will be more clearly explained later. The absorption of infrared radiation by PET is low because PET tends to absorb infrared radiation only at certain frequencies as will be described later. Thus, the rate of heating PET is very dependent upon the ability of the polymer resin to absorb the infrared radiation and any component within the PET composition which can improve the absorption of infrared radiation is commercially useful for bottle manufacturers.

U.S. Pat. Nos. 5,409,983, 5,419,936 and 5,529,744 to Tindale and assigned to ICI disclose a polyester composition which includes an infrared radiation absorbing material comprising suitable metals which intrinsically absorb radiation in the wavelength region of 0.5 micron to 2 microns (NIR and IR) to substantially reduce the reheat time of the polymer or bottle preform. Suitable NIR and IR absorbing metals include antimony, tin, copper, silver, gold, arsenic, cadmium, mercury, lead, palladium and platinum, and mixtures thereof. For most applications, the metals silver, gold, arsenic, cadmium, mercury, lead, palladium and platinum are either too expensive or environmentally hazardous and these metals are not particularly preferred. The preferred metals are one or more of antimony, tin or copper, antimony being particularly preferred.

U.S. Pat. Nos. 4,408,004, and 4,535,118 to Pengilly and initially assigned to Goodyear disclose a polyester having improved infrared absorbing materials contained therein. The only infrared absorbing material mentioned is carbon black including specific types such as channel black and furnace black. The carbon black has an average particle size from 10 to 500 nanometers and is used at a concentration from 0.1 to 10 parts by weight per million parts by weight of the polyester employed. This composition substantially reduces the time required to heat the preform to approximately 105° C.

SUMMARY OF THE INVENTION

The present invention relates to a polymer resin containing inorganic black pigments or particles, the size of the inorganic pigments or particles being such that they are not readily visible to the naked eye when uniformly dispersed in the resin and present in an amount from about 3 to about 150 parts by weight per million parts (ppm) by weight of the polymer resin. Preferably, the polymer contains at least about 80% by weight polyester polymer. The preferred polymer resin is a polyester resin.

In addition, the present invention includes a method of heating either a polyester resin or a polyester bottle preform by exposing the polyester resin or polyester bottle preform to infrared radiation for a sufficient time to heat the polyester resin or polyester bottle preform to greater than ambient temperature, wherein the polyester resin or polyester bottle preform contains about 3 to about 150 ppm inorganic black pigments or particles, the particles being not readily visible to the naked eye when uniformly dispersed therein.

Further, the present invention also relates to a bottle preform which can be heated with IR heaters to the desired blow-molding temperature, and blow-molded in the form of a plastic bottle, said bottle preform being made from polyester that contains inorganic black pigments or particles, with the size of the particles being sufficiently small such that they are not readily visible to the naked eye when uniformly dispersed within the bottle preform.

The inorganic particles are present in an amount from about 3 to about 150 ppm based upon the amount of polyester resin.

The present invention also relates to a plastic bottle made from polyester that contains inorganic black pigments or particles, said particles being sufficiently small that they are not readily visible to the naked eye upon uniform distribution within the plastic bottle and are employed in an amount of about 3 to about 150 ppm based on the amount of polyester.

DETAILED DESCRIPTION AND BEST MODE OF THE INVENTION

As used herein, the term "polymer" signifies "polymers and copolymers," and the term "polyester" signifies "polyesters and copolyesters" as such terms are understood by those skilled in the art.

Infrared radiation covers wavelengths from 0.8 micron to 500 microns, and is generally broken down into near infrared (NIR 0.8 to 2.5 microns), middle IR (2.5 to 50 microns) and far IR (50 microns–500 microns). The lowest wavelength is near infrared and the lowest wavelength has the highest energy for heating. Heating occurs because the infrared radiation penetrates into the interior of the polymer and vibrates the molecules without subjecting the polymer to heating by conduction.

Figure 1:
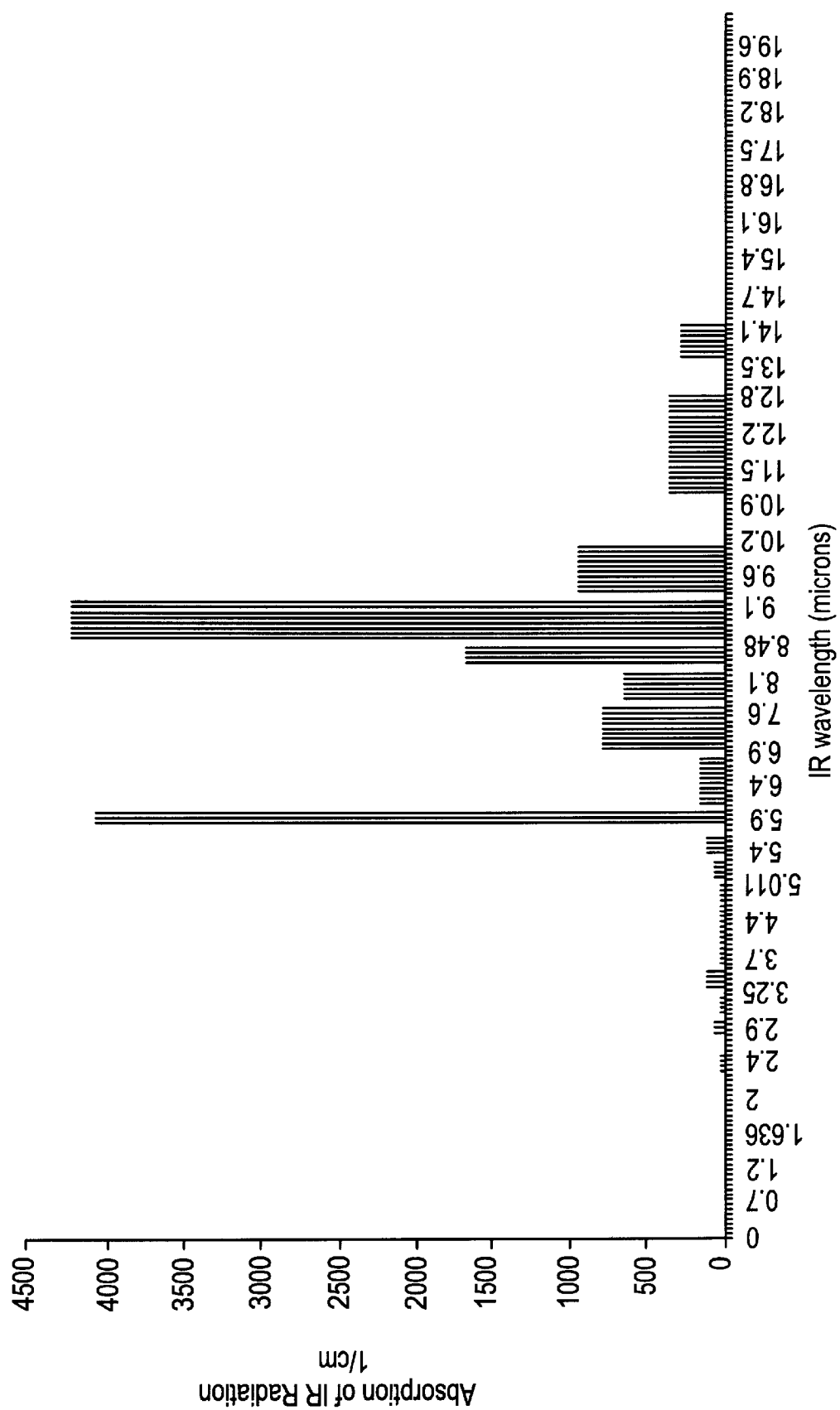
FIG. 1 is a chart of the PET Absorption Spectrum where IR wavelengths are plotted against the absorption coefficient (1/cm) of PET.

Polyester, and particularly polyethylene terephthalate (PET), can be heated by infrared radiation generally faster and more uniformly than by conduction heating. However, PET absorbs only a small portion of the IR wavelength. As shown in FIG. 1, which is a plot of the absorption coefficient (1/cm, which is the depth of penetration of the IR radiation) vs. IR wavelength (in microns), it is clear that PET primarily absorbs the IR wavelengths around 5.9 and about 8.7 to 9.1. These correspond to specific bond lengths in the polyester which are excited by the infrared radiation. From FIG. 1 it is easy to visualize that if polyethylene terephthalate could be modified such that it could absorb a wider range of IR wavelengths, it would require less time to be heated to approximately 105° C. in a preform and plastic bottle operation.

Of course, it is also necessary that the formed plastic bottle still exhibit good clarity. If the particles of the IR absorbing material, in the case of the present invention inorganic black pigments or particles, are too large in size, then the particles scatter the visible light wavelengths and cause the bottle to appear hazy and not clear, particularly from an aesthetic viewpoint. If it is desired to make a plastic translucent bottle which is brown-or green in color for certain specific types of soft drinks or alcoholic beverages such as beer or cola, then the size and amount of the inorganic particles is not so important. However, the industry does not want any particles to be seen with the naked eye even in translucent colored bottles. Nontranslucent colored bottles which are capable of masking the inorganic black pigments or particles can employ a broader size range of the inorganic black pigments or particles, so long as the inorganic black pigments or particles do not appear on the surface of the bottle. Such bottles can achieve the primary goal of using less energy to heat. the bottle preform for blow-molding. Particles up to about 200 microns in size may be used in accordance with the invention in such applications. Therefore, it is to be understood that while generally the particles utilized in accordance with the invention are of a size such that they are not visible to the naked eye when uniformly dispersed in the polymer resin, in some applications where the particles will be "masked", e.g., nontranslucent applications, the visibility criterion need not apply and particles up to about 200 microns may be used. The invention encompasses such applications.

When the particles are sufficiently large they scatter the visible light resulting in a hazy appearance. To maintain bottle clarity, it is generally believed that the particles should be predominantly about or below 1.5 microns and preferably below about 1.0 micron. Also, they should preferably be greater than 0.5 micron in the largest dimension. Additionally, a bottle may exhibit haziness if the polymer was subjected to sufficient energy levels that heat-induced crystallinity of more than about 30% occurred such that upon biaxial orientation (pressurized blow-molding) the crystalline structure is pulled apart to cause a haziness within the bottle. Thus, the amount of infrared absorbing material and the residence exposure time of the polymer to infrared radiation can also have an adverse effect on the bottle with respect to haze.

Although the main thrust of the present invention is directed toward polyester bottles, bottles comprising about 80% polyester and about 20% of other compatible polymers such as polyethylene, polypropylene, and similar polymers are also within the scope of the present invention. Suitable polyesters can be produced in a conventional manner as from the reaction of a dicarboxylic acid having 2 to 40 carbon atoms with polyhydric alcohols such as glycols, or diols containing from 2 to about 20 carbon atoms. The dicarboxylic acid can be an alkyl dicarboxylic acid having 2 to 20 carbon atoms, or an aryl- or alkyl-substituted aryl dicarboxylic acid containing from 8 to 16 carbon atoms. Additionally, an alkyl diester having from 4 to 20 carbon atoms or a substituted, e.g. alkyl-substituted aryl, diester having from 10 to 20 carbon atoms can be utilized in place of the dicarboxylic acid. Diols containing from 2 to 8 carbon atoms are particularly preferred, and most preferred is ethylene glycol. Moreover, glycol ethers having from 4 to 12 carbon atoms may be substituted for the glycol or diol. The most commonly produced polyester is made from either dimethyl terephthlate or terephthalic acid, with ethylene glycol. Such a reaction produces polyethylene terephthalate (PET). Suitable dicarboxylic acid include terephthalic acid, isophthalic acid, malonic, succinic, glutaric, adipic, suberic, sebacic, maleic and fumaric acid, all of which are well known dicarboxylic acid, or mixtures of these such that a copolyester is produced. Suitable glycols, in addition to ethylene glycol, include propylene glycol, 1,3-propanediol, glycerol, 1,2-butanediol, 1,4-butanediol, pentaerythritol, neopentylglycol, and similar glycols and diols, and mixtures thereof, all of which are well known in the art and can be used to produce a polyester or copolyester.

Conventional production of polyethylene terephthalate comprises reacting terephthalic acid with ethylene glycol at a temperature of about 200 to about 250° C. forming monomer and water. Because the reaction is reversible, the water is continuously removed, driving the reaction to the production of monomer. Next, the monomer undergoes a polycondensation reaction to form the polymer. During the reaction of the terephthalic acid and ethylene glycol it is not necessary to have a catalyst present. Generally, during the polycondensation reaction, the use of a catalyst is preferred; for example, antimony compounds or other catalysts known to those skilled in the art. In the making of bottle preforms and plastic bottles from the preforms, it is often desired to produce the cleanest, clearest polymer. Accordingly, the less additives employed, the clearer the polymer produced. On the other hand, it is sometimes desirable to make a colored plastic bottle which means that the bottle preform may also be colored. Accordingly, various pigments, dyes, fillers and other typical agents may be added to the polymer, generally during or near the end of the polycondensation reaction. The exact desired additives and the point of introduction during the reaction does not form a part of this invention and this technology is well known in the art. Any conventional system may be employed and those skilled in the art can pick and choose among the various systems for the introduction of additives to select the best for the desired result.

Any finely divided inorganic black pigments or particles are suitable for use in practicing the present invention, the primary limitations being (1) that they are approved for use in food packaging materials or for food contact, and (2) that when the inorganic particles are uniformly dispersed within the polymer, and when polymer is injection molded into bottle preforms and subsequently blow-molded into plastic bottles, no visible particles should be readily detected by the naked eye (for translucent articles only). Generally, particles under about 1–1.5 micron in size can not be readily detected by the naked eye. Further, uniformly dispersing the inorganic particles into the polymer can result in the inorganic particles becoming more finely divided.

The inorganic black pigments used herein were purchased from Shepherd Color Company, Cincinnati, Ohio, and are designated Jet Black 1G (herein Black 1G) and Jet Black 1 (herein Black 1). The black pigments have average particle sizes of 0.9 and 1.2 microns, respectively, and are copper chromite spinels. Similar pigments are commercially available from other sources (e.g., Ferro Corporation, Color Division, Cleveland, Ohio) and can also be used in practicing the invention.

The inorganic particles may be introduced into the polyester production process at any time. For example, if an ester and a glycol are being reacted, the inorganic particles can be introduced during the ester interchange reaction or during the polycondensation reaction. If a terephthalic acid and glycol reaction are being employed to make polyester, the inorganic particles can be introduced any time during the esterification reaction or during the polycondensation reaction.

The amount of inorganic pigments employed may range from about 3 ppm up to about 150 ppm based upon the weight of the resin. However, when a clear bottle is preferred, having about 70–80 ppm or more pigment (based on the weight of the resin) may produce a bottle that is smoky gray to dark gray in color as more pigment is added. While this may be acceptable for colored bottles, which the present invention is intended to cover, the preferred range of the present invention for clear, colorless bottles is between about 10 to about 70 ppm pigment, and more preferably between about 10 and about 50 ppm. If desired, master batches of the polymer composition or raw materials thereof containing quantities of the inorganic pigment in far higher concentrations can be made for subsequent blending with the polymer to achieve the desired levels of pigment in the polymer.

Test Methods

The intrinsic viscosity (IV) was determined by mixing 0.2 gram of the amorphous polymer composition with 20 milliliters of solvent consisting of dichoroacetic acid at a temperature of 25° C. and using a Ubbelo hde viscometer to determine the viscosity.

The haze of the amorphous polymer composition was determined by visual observation.

Brightness and yellowness of the amorphous polymer composition were determined by using a digital color monitor such as Hunter Lab Scan 6000. Usually the range of acceptable brightness is 25–35. The lower the number the grayer the polymer. For yellowness, a negative number indicates more blueness and a positive number indicates more yellowness. Preferably, the yellowness number is between −3 to −8 (not yellow, but not too blue).

Analysis of the DEG (diethylene glycol) content in the amorphous polymer resin was also performed. An appropriate portion of the amorphous polymer was hydrolyzed with an aqueous solution of ammonium hydroxide in a sealed reaction vessel at 220±5° C. for approximately two hours. The liquid portion of the hydrolyzed product was then analyzed by gas chromatography. The gas chromatography apparatus was a FID Detector (HP5890, HP7673A) from Hewlett Packard. The ammonium hydroxide was 28 to 30% by weight ammonia from Fisher Scientific and was reagent grade.

The CEG (carboxyl end groups) value of the amorphous polymer was determined by dissolving a sample of the amorphous polymer in reagent grade benzyl alcohol and titrating to the purple end point of Phenol Red indicator with 0.03N sodium hydroxide/benzyl alcohol solution. The results are reported as milliequivalents sodium hydroxide per kilogram of the sample.

The analysis of acetaldehyde in the amorphous polymer in parts per million was determined by obtaining a representative sample of the amorphous polymer and cryogenically grinding the polymer, using liquid nitrogen, such that the amorphous polymer passed through a number 10 mesh sieve but collected on a 25 mesh sieve. A weighted portion was then heated in a closed system to release the acetaldehyde. The acetaldehyde content of the headspace in the closed system was then determined by gas chromatography and the parts per million acetaldehyde was determined therefrom. The gas chromatography apparatus employed was the same as that employed for the DEG and CEG analysis.

The amount of catalysts and the sequestering agent in the amorphous polymer was determined using a Model Spectraspan III High Voltage DC Plasma Emission Spectrograph (Spectrometric Inc., Andover, Mass.). A sample of the amorphous polymer was placed in a cassette, the cassette introduced into the spectrograph, and the based line and the slope of each catalyst and sequestering agent present determined. The catalysts employed in the Example are antimony, manganese and cobalt, and the sequestering agent is phosphorous.

The glass transition temperature ($T_g$), the melt temperature ($T_m$), and the melt temperature of the crystalline polymer ($T_c$) were also determined. A differential scanning calorimeter (DSC) was used to determine the temperature at the glass, crystallinity, and melt point transition. The rate of temperature increase/decrease was 10° C. per minute. The DSC instrument was a Model 910 DSC from Perkin-Elmer. The DSC was purged with nitrogen at a rate of 50 ml per minute.

The percent isophthalic acid present in the amorphous polymer was determined using a Hewlett Packard Liquid Chromatograph (HPLC) with an ultraviolet detector at 285 nanometers. An amorphous polymer sample was hydrolyzed in diluted sulfuric acid (10 ml acid in 1 liter deionized water) in a stainless steel bomb at 230° C. for 3 hours. After cooling, an aqueous solution from the bomb was mixed with three volumes of methanol (HPLC grade) and an internal standard solution. The mixed solution was introduced into the HPLC for analysis.

THE EXAMPLE

The samples in the Example were produced in a 500 pound pilot line reactor. The polymer was prepared from 199 kilograms of DMT and 135 kilograms of ethylene glycol using 82 parts per million (ppm) manganese (as manganese acetate), 250 parts per million antimony (as antimony trioxide), 65 parts per million cobalt (as cobalt acetate), and 1.4 weight % diethylene glycol (based on the weight of the polymer). Eight separate batches were prepared with 10, 30, 50 and 100 parts by weight Black 1G and Black 1 pigment, respectively, per million parts by weight polymer. In addition, commercial-grade T-97 resin (T-97 PET, Hoechst Celanese Corporation, Summit, N.J.), which does not contain inorganic pigments, was used as a control resin. The maximum ester interchange batch temperature was about 250° C. When the ester interchange reaction was finished, the methanol was removed. At the start of the polycondensation reaction 69.7 parts by weight phosphorus per million parts by weight polymer was added in form of polyphosphoric acid as a sequestering agent to arrest the ester interchange catalytic activity.

Additionally, 2.5 wt. % (based on the weight of the polymer) of isophthalic acid was employed, thus forming the copolyester polyethylene terephthalate isophthalate.

The results of this Example are set forth in Table 1.

of the infrared pyrometer is about 1° C.). The blow-molding window of the resin was defined as the temperature range of the preforms that yielded a slightly pearlescent to a slightly hazy bottle. Using the control polymer's optimized blow-molding conditions, heat scans were then performed on the other resins.

Figure 2:
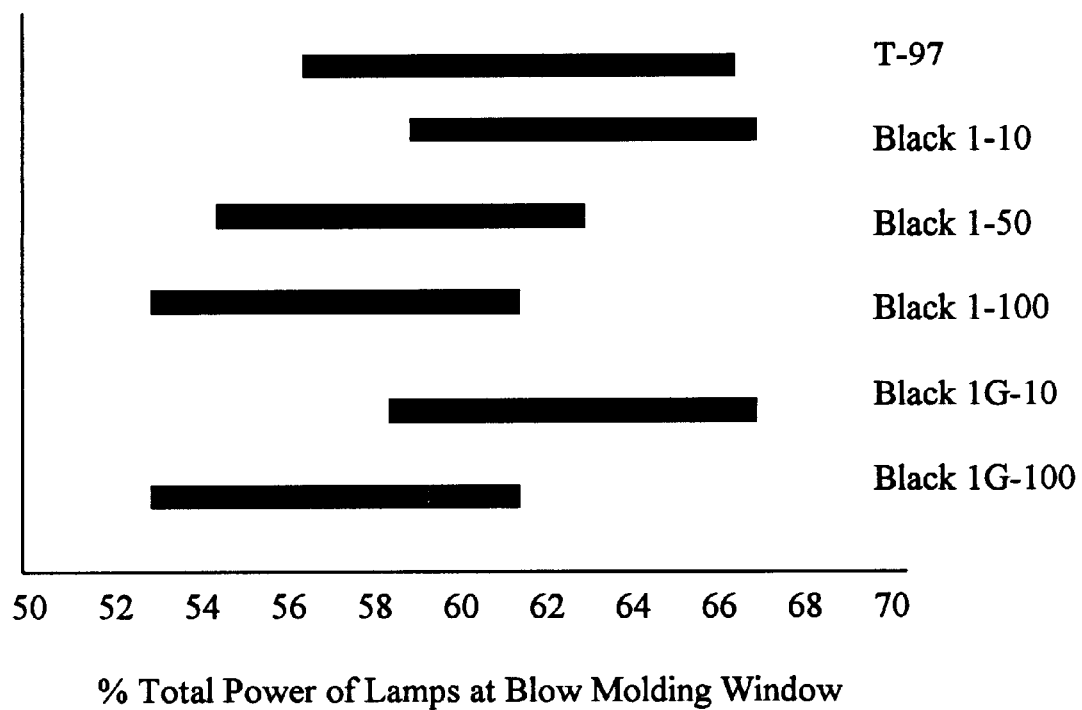
FIG. 2 is a bar graph illustrating Percent Total Power of Lamps at Blow-molding Window where 10 ppm, 50 ppm and 100 ppm inorganic black pigment/polymer compositions are plotted against the % Total Power of IR lamps.

Table 2 gives the Preform Temperature and % Total Power of Lamps results for selected Black 1 and Black 1G preforms and the T-97 control. The blow-molding window is defined as the preform temperatures of visuals from slightly pearlescent to slightly hazy i.e., the "width"). The % Total Power of Lamps is given for the observed blow-molding window. The plot of various inorganic black pigment/polymer compositions versus % Total Power of Lamps is also shown in FIG. 2.

TABLE 2

| | Preform Temperature, ° C. | | | % Total Power of Lamps | | |
|---|---|---|---|---|---|---|
| Sample | Pearl | Width | Haze | Pearl | Width | Haze |
| T-97 | 98 | 13 | 111 | 57 | 9 | 66 |
| Black 1-10 | 98 | 13 | 111 | 59 | 8 | 67 |
| Black 1-50 | 97 | 12 | 109 | 55 | 8 | 63 |

TABLE 1

| TYPE | AMORPHOUS POLYMER | | | DEG | | A/A | Sb | Mn | Co | P | Tg | Tc | Tm | IPA |
| | IV | Yellowness | Brightness | % | CEG | ppm | ppm | ppm | ppm | ppm | ° C. | ° C. | ° C. | % |
|---|---|---|---|---|---|---|---|---|---|---|---|---|---|---|
| Control, T-97 | | −0.8 | 71.9 | 1.21 | 16 | 1 | 281 | 0 | 49 | 33 | 78.7 | 156.8 | 244.7 | 3 |
| BLACK 1 | | | | | | | | | | | | | | |
| Black 1-10 | 0.670 | −7.9 | 29.5 | 1.56 | 22 | 63 | 206 | 78 | 64 | 65 | 76–81 | 156 | 245 | 2.33 |
| Black 1-30 | 0.667 | −6.5 | 27.4 | 1.57 | 23 | 65 | 213 | 76 | 64 | 66 | 79 | 159.7 | 245.6 | 2.35 |
| Black 1-50 | 0.671 | −6.8 | 22.2 | 1.58 | 23 | 89 | 210 | 76 | 64 | 71 | 76–82 | 149 | 245 | 2.38 |
| Black 1-100 | 0.665 | −7.5 | 18.8 | 1.51 | 23 | 55 | 207 | 81 | 63 | 64 | | | | 2.39 |
| BLACK 1G | | | | | | | | | | | | | | |
| Black 1G-10 | 0.674 | −7.7 | 29.5 | 1.53 | 33 | 70 | 210 | 79 | 62 | 67 | | | | 2.36 |
| Black 1G-30 | 0.682 | −4.7 | 25.8 | 1.59 | 25 | 73 | 199 | 77 | 61 | 70 | 79.4 | 159.2 | 246.3 | 2.31 |
| Black 1G-50 | 0.681 | −7.3 | 22.4 | 1.63 | 23 | 72 | 197 | 81 | 71 | 70 | | | | 2.36 |
| Black 1G-100 | 0.676 | −6.7 | 17.1 | 1.54 | 24 | 75 | 208 | 78 | 61 | 66 | | | | 2.38 |

Table 1 shows that the various inorganic black pigment samples have substantially the same features and properties as the control. The 100 ppm sample of Black 1 had the best (lowest) acetaldehyde level, but brightness properties were not satisfactory for making clear bottles. Green or brown colored plastic bottles may be produced with a 100 ppm of either Black 1 or Black 1G polymer.

The blow-molding windows and preform reheat properties of the PET control and selected PET samples containing 10, 50 and 100 ppm of Black 1 and Black 1G were analyzed at Plastic Technologies, Inc. ("PTI", Holland, Ohio). The bottles were blown on a Sidel SBO ⅔ production machine using a single 2-liter generic carbonated soft drink bottle mold. First, the blow-molding conditions were optimized for the control resin. A "heat scan" was then performed on the control resin by lowering and raising the percent overall power of the quartz oven lamps in 2% increments. Ten bottles were blown at each percent overall power and one of the middle bottles was observed for amount of pearlescence or haze. The preform temperature at the oven outlet of the SBO machine was recorded using an infrared pyrometer that reads the surface temperature of the preform (the variability

TABLE 2-continued

| | Preform Temperature, ° C. | | | % Total Power of Lamps | | |
|---|---|---|---|---|---|---|
| Sample | Pearl | Width | Haze | Pearl | Width | Haze |
| Black 1-100 | 98 | 13 | 111 | 53 | 8 | 61 |
| Black 1G-10 | 99 | 12 | 112 | 59 | 8 | 61 |
| Black 1G-100 | 98 | 14 | 112 | 53 | 8 | 61 |

Table 2 and FIG. 2 indicate that adding between about 50 to about 100 ppm of Black 1 or Black 1G will yield a preform with reheat properties superior to that of the T-97 control. The addition of about 100 ppm of the black pigments may result in a bottle having a smoky neck. While this may present a problem where "colorless" bottles are required, it will not affect colored bottles.

FIG. 2 clearly indicates that when inorganic black pigments are employed, less power is used by the Sidel SBO ⅔ IR lamps to heat the polymer to a temperature such that it can be blow-molded into an acceptable plastic bottle (approximately 100° C.). The addition of 50 ppm of Black 1 (shown) or Black 1G (not shown) will result in a polymer bottle having about 4–5% improvement in power requirements (i.e., use less power) and better color properties where "colorlessness" is desired. At 100 ppm inorganic black pigment the improvement in power requirements is about 7–8%.

Figure 3:
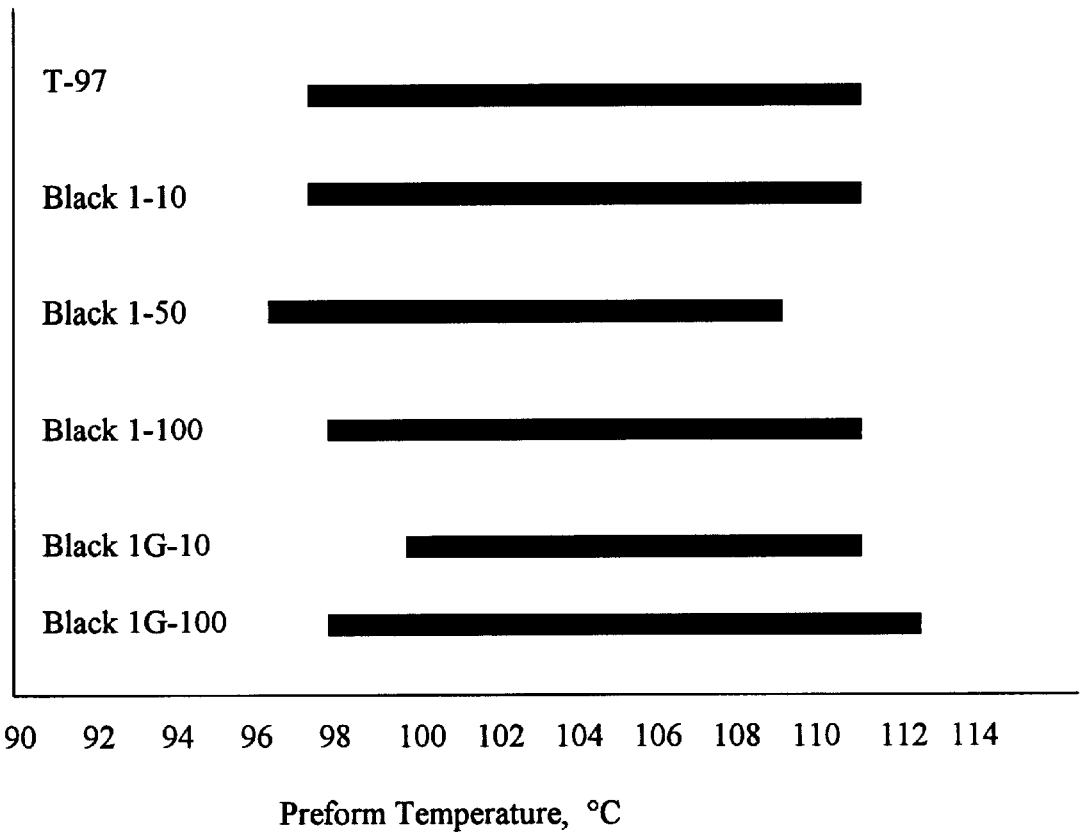
FIG. 3 is a bar graph illustrating the Blow-molding Window where the control and 10 ppm, 50 ppm and 100 ppm inorganic black pigment/polymer compositions are plotted against the temperature in ° C.

FIG. 3 shows the blow-molding window for the bottle preforms (set forth in FIG. 2) versus the preform temperature (in ° C.). The blow-molding window is the temperature range where the preform can be blow-molded into a clear plastic bottle. If the temperature is too cool (generally below approximately 100° C.) blow-molding will cause cold stretching of the polymer, creating a whitish color in the bottle referred to as pearlescence. Obviously stretching at too cold of a temperature is not desired as it affects the physical properties, the ability of the bottle to properly conform to the shape of the mold when being blown, and the overall appearance of the bottle.

On the other hand, if the bottle preform reaches too high of a temperature, heat-induced crystallinity of the polymer makes it difficult to properly blow-mold the polymer because the crystalline structure cannot be biaxially oriented. Only an amorphous structure can be biaxially oriented. Having a narrow blow-molding window means that the process must be controlled very tightly and leaves no room for error. Having a wide blow-molding window is desirable. Shifting the blow-molding window to cooler temperatures means that the preform achieves the desired temperature (necessary to blow-mold the plastic bottle) in less time and uses less power from the IR lamps, thus saving energy and increasing the output of the number of plastic bottles that can be produced in a specific time period.

Thus it is apparent that there has been provided, in accordance with the invention, a product and process that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A polymeric composition useful for absorbing IR radiation, the composition comprising:
   (a) a polymer comprising at least 80% by weight polyester polymer, wherein said polyester polymer is selected from the group consisting of polyester polymers formed from:
      (1) dicarboxylic acids having 2–40 carbon atoms and polyhydric alcohols containing 2–20 carbon atoms;
      (2) alkyl diesters having 4–20 carbon atoms and polyhydric alcohols containing 2–20 carbon atoms; and
      (3) substituted aryl diesters having 10–20 carbon atoms and polyhydric alcohols containing 2–20 carbon atoms; and
   (b) about 3 to about 150 parts by weight IR absorbing inorganic black pigments or IR absorbing inorganic black particles per million parts by weight of said polymer;
wherein said inorganic black pigments or inorganic black particles are greater than 0.5 micron and up to 200 microns in size.

2. The polymeric composition according to claim 1, wherein said polyester polymer is a polyethylene terephthalate isophthalate copolyester.

3. A polymeric composition useful for absorbing IR radiation, the composition comprising:
   (a) a polymer comprising at least 80% by weight polyester polymer, wherein said polyester polymer is selected from the group consisting of polyester polymers formed from:
      (1) dicarboxylic acids having 2–40 carbon atoms and polyhydric alcohols containing 2–20 carbon atoms;
      (2) alkyl diesters having 4–20 carbon atoms and polyhydric alcohols containing 2–20 carbon atoms; and
      (3) substituted aryl diesters having 10–20 carbon atoms and polyhydric alcohols containing 2–20 carbon atoms; and
   (b) about 3 to about 150 parts by weight IR absorbing inorganic black pigments or IR absorbing inorganic black particles per million parts by weight of said polymer;
wherein said inorganic black pigments or inorganic black particles, when uniformly dispersed in said polymer, are not visible to the naked eye.

4. The polymeric composition of claim 3, wherein said inorganic black pigments are greater than 0.5 micron in the largest dimension.

5. The polymeric composition of claim 3, wherein said polyester polymer is a polyethylene terephthalate and isophthalate copolyster.

6. A polymeric bottle preform for making plastic bottles, said preform comprising a polymeric composition useful for absorbing IR radiation, the composition comprising:
   (a) a polymer comprising at least 80% by weight polyester polymer, wherein said polyester polymer is selected from the group consisting of polyester polymers formed from:
      (1) dicarboxylic acids having 2–40 carbon atoms and polyhydric alcohols containing 2–20 carbon atoms;
      (2) alkyl diesters having 4–20 carbon atoms and polyhydric alcohols containing 2–20 carbon atoms; and
      (3) substituted aryl diesters having 10–20 carbon atoms and polyhydric alcohols containing 2–20 carbon atoms; and
   (b) about 3 to about 150 parts by weight IR absorbing inorganic black pigments or IR absorbing inorganic black particles per million parts by weight of said polymer;
wherein said inorganic black pigments or inorganic black particles, when uniformly dispersed in said polymer, are not visible to the naked eye.

7. The polymeric bottle preform of claim 6, wherein said inorganic black pigments are greater than about 0.5 micron in the largest dimension.

8. The polymeric bottle preform of claim 6, wherein said polyester polymer is a polyethylene terephthalate and isophthalate copolyster.

9. A plastic bottle capable of absorbing IR radiation, said bottle comprising a polymeric composition useful for absorbing IR radiation, the polymeric composition comprising:
   (a) a polymer comprising at least 80% by weight polyester polymer, wherein said polyester polymer is selected from the group consisting of polyester polymers formed from:
      (1) dicarboxylic acids having 2–40 carbon atoms and polyhydric alcohols containing 2–20 carbon atoms;
      (2) alkyl diesters having 4–20 carbon atoms and polyhydric alcohols containing 2–20 carbon atoms; and
      (3) substituted aryl diesters having 10–20 carbon atoms and polyhydric alcohols containing 2–20 carbon atoms; and
   (b) about 3 to about 150 parts by weight IR absorbing inorganic black pigments or IR absorbing inorganic black particles per million parts by weight of said polymer;

wherein said inorganic black pigments or inorganic black particles, when uniformly dispersed in said polymer, are not visible to the naked eye.

10. The plastic bottle of claim 9, wherein said inorganic black pigments are greater than about 0.5 micron in the largest dimension.

11. The plastic bottle of claim 9, wherein said polyester polymer is a polyethylene terephthalate and isophthalate copolyester.

12. A method of blow-molding a bottle preform into a plastic bottle, said method comprising:
(A) heating a bottle preform using IR radiation to a sufficient temperature such that the preform can be blow-molded into an acceptable plastic bottle having no pearlescence and no heat induced crystallization, and
(B) blow-molding said preform into said plastic bottle; wherein said bottle preform comprises:
  (a) a polymer comprising at least 80% by weight polyester polymer, wherein said polyester polymer is selected from the group consisting of polyester polymers formed from:
    (1) dicarboxylic acids having 2–40 carbon atoms and polyhydric alcohols containing 2–20 carbon atoms;
    (2) alkyl diesters having 4–20 carbon atoms and polyhydric alcohols containing 2–20 carbon atoms; and
    (3) substituted aryl diesters having 10–20 carbon atoms and polyhydric alcohols containing 2–20 carbon atoms; and
  (b) about 3 to about 150 parts by weight IR absorbing inorganic black pigments or IR absorbing inorganic black particles per million parts by weight of said polymer;
wherein said inorganic black pigments or inorganic black particles, when uniformly dispersed in said polymer, are not visible to the naked eye.

13. The method of claim 12, wherein said inorganic black pigments are greater than 0.5 micron in the largest dimension.

14. The method of claim 12, wherein said polyester polymer is a copolyester of polyethylene terephthalate and isophthalate copolyester.

15. A method of heating a plastic bottle preform, said method comprising:
exposing the plastic bottle preform to infrared radiation for a sufficient time to heat the plastic bottle preform to greater than ambient temperature, said plastic bottle preform comprising:
  (a) a polymer comprising at least 80% by weight polyester polymer, wherein said polyester polymer is selected from the group consisting of polyester polymers formed from:
    (1) dicarboxylic acids having 2–40 carbon atoms and polyhydric alcohols containing 2–20 carbon atoms;
    (2) alkyl diesters having 4–20 carbon atoms and polyhydric alcohols containing 2–20 carbon atoms; and
    (3) substituted aryl diesters having 10–20 carbon atoms and polyhydric alcohols containing 2–20 carbon atoms; and
  (b) about 3 to about 150 parts by weight IR absorbing inorganic black pigments or IR absorbing inorganic black particles per million parts by weight of said polymer;

wherein said inorganic black pigments or inorganic black particles, when uniformly dispersed in said polymer, are not visible to the naked eye.

16. A polymeric composition according to claim 3 wherein the size of the inorganic black pigments or inorganic black particles which said composition comprises is predominantly about or below 1.5 microns.

17. The polymeric composition according to claim 16 wherein the amount of the inorganic black pigments or inorganic black particles is in the range between 10 and 70 parts per million based on the weight of the polymer.

18. A polymeric composition according to claim 1 wherein the size of the inorganic black pigments or inorganic black particles which said composition comprises is predominantly about or below 1.5 microns.

19. A polymeric composition according to claim 18 wherein the amount of the inorganic black pigments or inorganic black particles is in the range between 10 and 70 parts per million based on the weight of the polymer.

20. A polymeric composition according to claim 1 wherein the amount of the inorganic black pigments or inorganic black particles is in the range between 10 and 70 parts per million based on the weight of the polymer.

21. A polymeric bottle preform according to claim 6 wherein the size of the inorganic black pigments or inorganic black particles which said bottle preform comprises is predominantly about or below 1.5 microns.

22. A polymeric bottle preform according to claim 21 wherein the amount of the inorganic black pigments or inorganic black particles is in the range between 10 and 70 parts per million based on the weight of the polymer.

23. A polymeric bottle preform according to claim 8 wherein the size of the inorganic black pigments or inorganic black particles which said bottle preform comprises is predominantly about or below 1.5 microns.

24. A polymeric bottle preform according to claim 23 wherein the amount of the inorganic black pigments or inorganic black particles is in the range between 10 and 70 parts per million based on the weight of the polymer.

25. A plastic bottle according to claim 9 wherein the size of the inorganic black pigments or inorganic black particles which said bottle comprises is predominantly about or below 1.5 microns.

26. A plastic bottle according to claim 25 wherein the amount of the inorganic black pigments or inorganic black particles is in the range between 10 and 70 parts per million based on the weight of the polymer.

27. A plastic bottle according to claim 9 which comprises the inorganic black pigments.

28. A method according to claim 12 wherein the bottle preform comprises the inorganic black pigments in an amount in the range between 10 and 70 parts per million.

29. A method according to claim 28 wherein the size of the pigments is predominantly about or below 1.5 microns.

30. A method according to claim 29 wherein the polyester polymer is a polyethylene terephthalate isophthlate copolyester.

31. A method according to claim 12 which comprises using less energy to heat the bottle preform to said sufficient temperature by infrared radiation than would be required without the presence of the inorganic black pigments or inorganic black particles.

32. A polymeric composition according to claim 1, wherein the inorganic black pigments and inorganic black particles are approved for use in food packaging materials or for food contact.

33. The polymeric composition according to claim 3, wherein the inorganic black pigments and inorganic black particles are approved for use in food packaging materials or for food contact.

34. The polymeric composition according to claim 3, wherein the inorganic black pigments and inorganic black particles are predominately about or below 1.5 microns and are employed in an amount in the range between about 10 and 50 parts per million based on the weight of the polymer.

35. A polymeric bottle preform according to claim 6, made from a polyester polymer containing about 3 to about 150 parts by weight IR absorbing inorganic black pigments or inorganic black particles per million parts by weight of said polymer and wherein the inorganic black pigments and inorganic black particles are approved for use in food packaging materials or for food contact.

36. A plastic bottle according to claim 9, made from a polyester polymer containing about 3 to about 150 parts by weight IR absorbing inorganic black pigments or inorganic black particles per million parts by weight of said polymer and wherein the inorganic black pigments and inorganic black particles are approved for use in food packaging materials or for food contact.

37. A method according to claim 12 wherein the bottle preform is made from a polyester polymer containing about 3 to about 150 parts by weight IR absorbing inorganic black pigments or inorganic black particles per million parts by weight of said polymer and wherein the inorganic black pigments and inorganic black particles are approved for use in food packaging materials of for food contact.

38. A method according to claim 15 wherein the inorganic black pigments and inorganic black particles are approved for use in food packaging materials or for food contact.

39. A polymeric composition according to claim 1 which comprises the inorganic black pigments and wherein said inorganic black pigments are copper chromite spinels.

40. A composition according to claim 2 which comprises the inorganic black pigments and wherein said inorganic black pigments are copper chromite spinels.

41. A polymeric bottle preform according to claim 6, which comprises the inorganic black pigments and wherein said inorganic black pigments are copper chromite spinels.

42. A plastic bottle according to in claim 9, which comprises the inorganic black pigments and wherein said inorganic black pigments are copper chromite spinels.

43. A bottle according to claim 10 which comprises the inorganic black pigments and wherein said inorganic black pigments are copper chromite spinels.

44. A bottle according to claim 11 which comprises the inorganic black pigments and wherein said inorganic black pigments are copper chromite spinels.

45. A method according to claim 12, wherein the bottle preform comprises the inorganic black pigments and wherein said inorganic black pigments are copper chromite spinels.

46. A composition according to claim 19 which comprises the inorganic black pigments and wherein said inorganic black pigments are copper chromite spinels.

47. A bottle preform according to claim 24 which comprises the inorganic black pigments and wherein said inorganic black pigments are copper chromite spinels.

48. A polymeric composition according to claim 1 wherein the polymer consists of polyester.

* * * * *